United States Patent [19]
Coulson

[11] Patent Number: 5,862,350
[45] Date of Patent: Jan. 19, 1999

[54] METHOD AND MECHANISM FOR MAINTAINING INTEGRITY WITHIN SCSI BUS WITH HOT INSERTION

[75] Inventor: Richard L. Coulson, Portland, Oreg.

[73] Assignee: Intel Corporation, Santa Clara, Calif.

[21] Appl. No.: 778,514

[22] Filed: Jan. 3, 1997

Related U.S. Application Data

[63] Continuation of Ser. No. 361,988, Dec. 22, 1994, abandoned.

[51] Int. Cl.[6] .................................................. G06F 13/00
[52] U.S. Cl. ............................................. 395/283; 395/828
[58] Field of Search ............................... 395/800.01, 833, 395/835, 281–283, 828, 500, 182.05, 183.19, 183.2; 371/8.1, 10.1, 9.1, 11.1, 11.3, 21.1; 364/184–187

[56] References Cited

U.S. PATENT DOCUMENTS

| | | | |
|---|---|---|---|
| 5,157,771 | 10/1992 | Losi et al. ................................ | 395/283 |
| 5,210,855 | 5/1993 | Bartol ....................................... | 395/500 |
| 5,297,067 | 3/1994 | Blackborow et al. ................. | 364/708.1 |
| 5,371,743 | 12/1994 | DeYesso et al. ..................... | 395/182.08 |
| 5,454,080 | 9/1995 | Fasig et al. ............................. | 395/283 |
| 5,488,541 | 1/1996 | Mistry et al. ........................... | 361/788 |

Primary Examiner—Alpesh M. Shah
Attorney, Agent, or Firm—Blakely, Sokoloff, Taylor & Zafman LLP

[57] ABSTRACT

A mechanism and method for quiescing a SCSI bus by asserting the busy signal just prior to the SCSI signal pins making contact or decoupling during a hot modification. A hot modification is an insertion, removal or exchange of a device coupled to a SCSI interface bus while the system is operating (e.g., not powered down). By asserting the busy line for a predetermined and short period of time during the disturbance of the SCSI signal pins, glitches or noise introduced by the coupling or decoupling of the signal lines is isolated and prevented from causing transmission errors over the SCSI bus. According to the system described, any communication over the SCSI bus made just prior to the hot modification is allowed to complete before the signal pins are interrupted. For hot insertions, the system utilizes longer pins on the connector to assert the busy line just before coupling of the other pins of the connector. For removal, a special pair of short pins are placed on the connector to assert busy when decoupled. In either case, the busy line is then maintained as asserted for a predetermined period of time after the initial assertion to allow for communication over the SCSI bus to terminate before the hot modification.

9 Claims, 6 Drawing Sheets

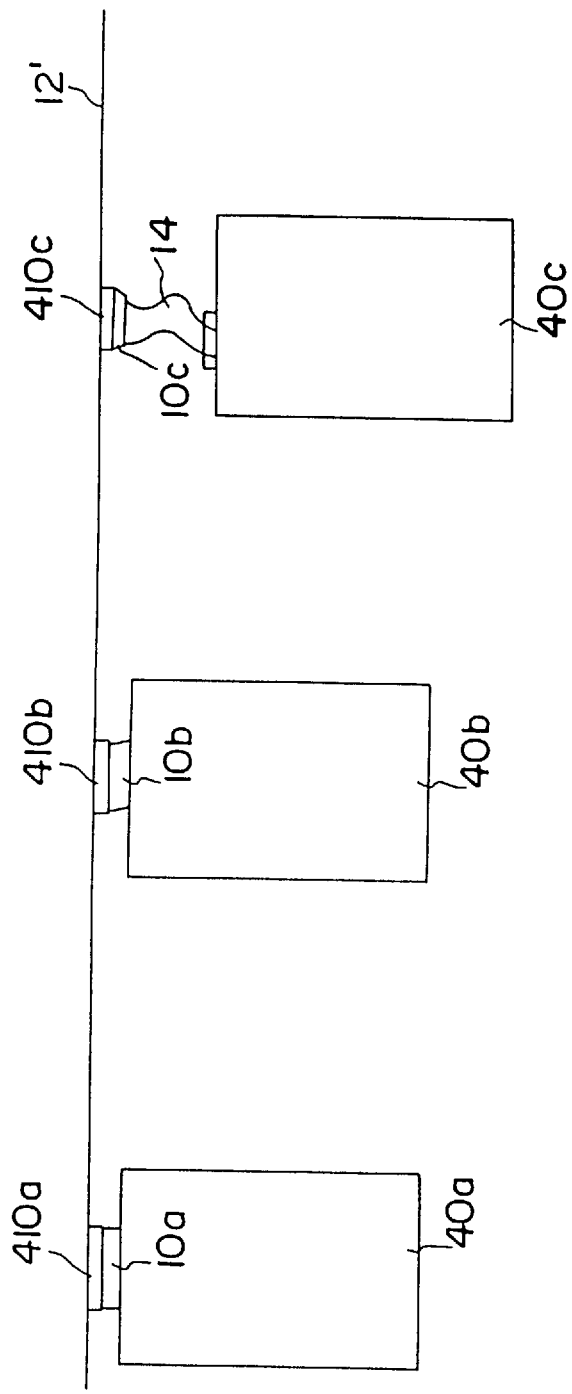
FIG. IB

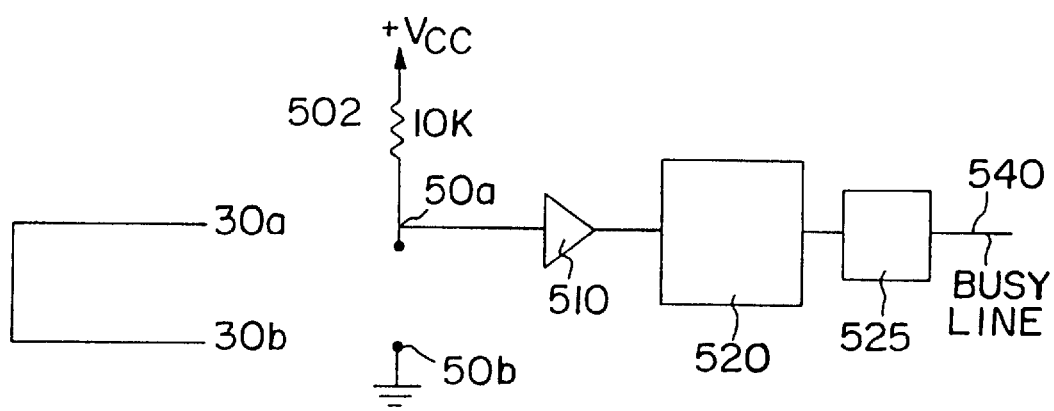
F I G. 6

METHOD AND MECHANISM FOR MAINTAINING INTEGRITY WITHIN SCSI BUS WITH HOT INSERTION

This is a continuation of application Ser. No. 08/361,988, filed Dec. 22, 1994, now abandoned.

BACKGROUND OF THE INVENTION (1). Field of the Invention

The present invention relates to the field of information communication. More specifically, the present invention relates to reducing error in data transmissions over a Small Computer System Interface (SCSI) bus.

(2). Prior Art

The SCSI interface is a popular communications interface for coupling computer systems and computer system peripherals together. Large networked computer systems using a complex set of peripherals, such as disk drives, printers, tape drives, etc., can be implemented using the SCSI bus as their communication platform. Often, it is required to modify the component makeup of such a computer system (e.g., for the addition or exchange of a disk drive, etc.) while the computer system is operating. These types of exchanges are referred to as "hot" modifications to the computer system because the computer system is operating during the modification. A "hot" modification can refer to the hot insertion, exchange or removal of a particular device from the computer system while operating.

During a "hot" modification of the devices coupled to a given SCSI interface bus, the possibility of data corruption exists. Single-ended SCSI interfaces have weak noise margins electrically and hot modifications reduce this noise margin even further since some slight glitching of signal and power busses can occur during the modification. Glitching is characterized in part as electrical interference or transient signals caused by the addition of variable inductance and capacitance levels when the SCSI signal pins contact during a hot modification. Glitching can readily cause errors in the transmission of data bytes over the SCSI interface. Importantly, these errors may not be detected by the SCSI parity mechanisms among other reasons because two bits may be in error and the corruption of each bit is not an independent event. Therefore, the probability of an undetectable double bit error is not negligible as a result of a hot insertion. An undetected error as a result of a hot insertion could also be from an glitch in a control signal causing clock errors that are not detected by parity checks. What is needed is a mechanism for allowing hot modifications of devices of a SCSI interface without causing transmission data errors between devices. The present invention offers such advantageous capability.

Two approaches are currently used to reduce the probability of data errors resulting from hot modifications of a computer system's devices in order to maintain data integrity. The first is the use of a differential SCSI interface which is a much more robust electrical design that is not susceptible to bit errors as described above. However, the use of differential SCSI interface electrical design significantly adds to the cost of a typical computer system and in many environments the use of a differential SCSI communication interface is not economically practical or viable. The use of differential SCSI interface electrical design also adds to the cost of the required SCSI controller hardware. This added cost is also unacceptable in high volume markets. What is needed is a mechanism for reducing or eliminating the errors associated with hot modifications without requiring or using such a costly alternative. The present invention offers such advantageous functionality.

A second approach is to reset the SCSI bus immediately after detection of a hot modification, so as to force the retransmission of any data transfer in progress during the hot modification. Although this approach does not add to the cost of the overall system, it requires third party controllers to be able to correctly react to a reset which they did not initiate. Those devices that are not programmed to respond to the reset will not perform the required retransmission and are therefore susceptible to data loss. Further, special firmware creates added product complexity and special devices are required, so products "off-the-shelf" are no longer compatible with the general computer system. Further, this approach causes an unwanted several-second delay in communication while the reset signal is interrogated, processed and the retransmissions are performed. What is needed is a mechanism for maintaining SCSI data integrity that does not require custom programming for the devices or retransmission of data in response to a reset. The present invention provides for such alternatives.

Accordingly, it is an object of the present invention to provide data integrity over a single ended SCSI bus interface in response to hot modifications. It is an object of the present invention to provide the above using a mechanism and method that is cost effective and avoids the requirement of using a differential SCSI. It is yet another object of the present invention to provide a mechanism and method that does not require custom firmware or programming for each device to respond to a reset signal and thereafter require the retransmission of suspected lost data. It is another object of the present invention to provide a solution to the hot modification problem that does not cause unreasonable delay within the SCSI interface in response to the hot modification. These and other objects of the present invention not specifically recited above will become clear within discussions of the present invention herein.

SUMMARY OF THE INVENTION

A mechanism and method are described for quiescing a SCSI bus by asserting the busy signal just prior to the SCSI signal pins making contact or decoupling during a hot modification. A hot modification is an insertion, removal or exchange of a device coupled to a SCSI interface bus while the system is operating (e.g., not powered down). By asserting the busy line for a predetermined and short period of time during the disturbance of the SCSI signal pins, glitches or noise introduced by the coupling or decoupling of the signal lines is isolated and prevented from causing transmission errors over the SCSI bus. According to the system described, any communication over the SCSI bus made just prior to the hot modification is allowed to complete before the signal pins are interrupted. For hot insertions, the system utilizes a set of longer pins on the connector to assert the busy line just before coupling of the other pins of the connector. For connector removal, a special set of short pins can be alternatively used in a similar manner but for decoupling. The busy line is then maintained as asserted for a predetermined period of time after the initial assertion to allow for communication over the SCSI bus to terminate before the hot modification.

Specifically, embodiments of the present invention include a connector for coupling to a single ended SCSI interface bus without causing data loss, the connector comprising: a connector structure for securing signal pins, the connector structure coupled to a first single ended SCSI cable; long pins coupled to the connector structure for asserting a first signal; a set of pins coupled to the connector structure wherein individual pins of the set of pins are smaller in length than the long pins; the long pins being adapted for mating with a receiving hole of a female connector in advance of the set of pins mating with the female connector when the connector structure is coupled with the female connector, the female connector coupled to a second single ended SCSI bus; and the first signal for asserting a SCSI busy signal line in advance of and while the set of pins mates with the female connector and for maintaining assertion of SCSI busy signal for a first predetermined time period after the set of pins mates with the female connector and further wherein the long pin mates with the female connector a second predetermined time period before the set of pins mates with the female connector and wherein the second predetermined time period is longer than the longest expected SCSI information transmission and wherein assertion of the busy signal line prevents communication transmission over the single ended SCSI interface bus while the set of pins mates with the female connector.

An embodiment of the present invention includes the above except short pins are used for assertion of the busy signal upon removal of the female connector and the connector structure.

Embodiments of the present invention also include methods for use implemented in accordance with the above connectors.

BRIEF DESCRIPTION OF THE DRAWINGS

FIG. 1B illustrates a long pin embodiment of the present invention using a backplane SCSI bus with several peripherals coupled thereto having SCA connectors.

FIG. 6 is a logical block and circuit diagram of an implementation of the signal generation logic of the hot insertion embodiment of the present invention.

DETAILED DESCRIPTION OF THE INVENTION

The present invention includes a mechanism and method for allowing hot modification of the component system of an operating computer system coupled via a single ended SCSI bus while maintaining data integrity during the modification. The SCSI is an interface using the American National Standard for Information Systems Small Computer System Interface Specification or (ASCII/SCSI) X3T9.2/82-2. The present invention provides mechanisms for asserting the busy line of the SCSI bus just before the signal pins of the SCSI bus are interrupted (coupled or decoupled). During this assertion of the busy line, the longest expected SCSI communication will terminate before the SCSI pins are actually interrupted as a result of the modification. Therefore, any signal glitches resulting from the modification will not adversely affect signal transmission over the SCSI bus because the SCSI bus will terminate valid transmission just before the modification and start transmission after the modification is over and signal glitches have ended. The present invention mechanisms and method operate, among other environments, with all types of parallel SCSI, SCSI-1, SCSI-2, SCSI-3 parallel, FAST SCSI, WIDE SCSI, FAST-20 SCSI, as an exemplary list.

The embodiments of the present invention discussed herein provide for assertion of the busy signal line as part of the normal manual connector removal and insertion process. Therefore, a user need not be expected to learn a new procedure or even be aware of the operation of the present invention to gain its advantages.

In the following detailed description of the present invention numerous specific details are set forth in order to provide a thorough understanding of the present invention. However, it will be obvious to one skilled in the art that the present invention may be practiced without these specific details. In other instances well known methods, procedures, components, and circuits have not been described in detail as not to unnecessarily obscure the present invention.

Figure 1A:
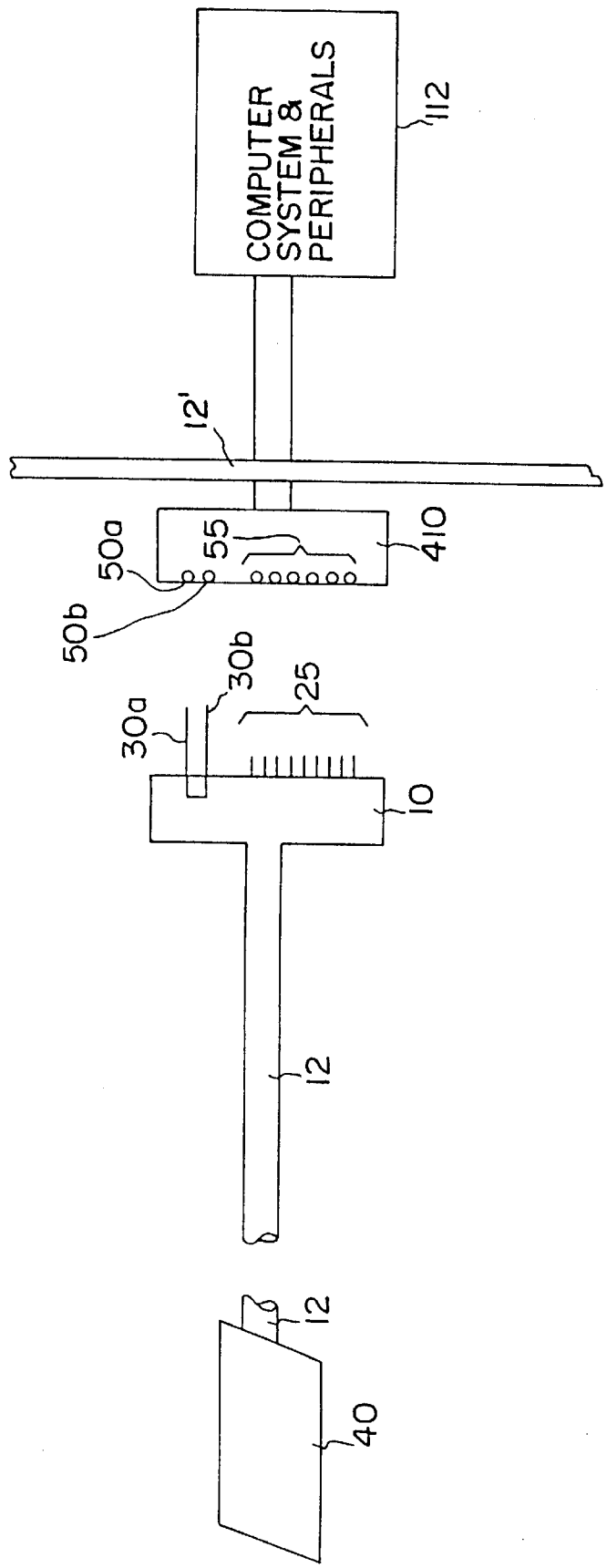
FIG. 1A illustrates a long pin embodiment of the present invention used during hot insertions of a device to an operating SCSI interface bus.

FIG. 1A illustrates an embodiment of the present invention for performing hot SCSI insertions of a component (e.g., peripheral device 40) into a SCSI bus interface of an operating computer system 112. A connector structure 10 having specialized pins 30a, 30b, and mounted thereon is utilized. A general purpose computer system including peripherals 112 is coupled via a single ended SCSI bus 12' to a female connector 410. The SCSI bus 12' illustrated is a backplane bus capable of containing a number of different SCA (Single Connector Attach) connectors such as connector 410. The female SCSI connector 410 contains receiving holes 55 and receiving holes 50a and 50b. Receiving holes 50a and 50b correspond to a circuit for asserting a signal over the SCSI busy signal line defined within the well known SCSI interface protocol. Receiving holes 55 correspond to the remainder of the well known and defined SCSI signal pins, including data transmission and receiving signal pins. It is appreciated that the present invention, as will be discussed in further detail, can operate within several different and well known connector styles having male and female mates and the connector style illustrated in FIG. 1A is exemplary only. The connector 10 of FIG. 1A can be a SCA peripheral connector and can be adapted for coupling to a backplane connector.

The peripheral device 40 of FIG. 1A is to be added to the computer system 112 while the system 112 is operating (e.g., a hot insertion). Peripheral device 40 (e.g., a disk drive) is coupled to a single ended SCSI bus cable 12 which is coupled to a connector structure 10 of the present invention having a specialized pin implementation. Connector 10 can also be located directly on the peripheral device case wherein bus 12 would be quite small. A special pair of long pins 30a and 30b is provided which are longer than the other set of pins 25 of the SCSI connector 10. These pins can be pins 58 and 59 of the well known SCSI interface. Each of these long pins 30a and 30b is approximately 1–3 mm longer than the pins of the other set of pins 25. However, the actual size of the long pins 30a and 30b can vary within the scope of the present invention. The important aspect of the long pins 30a and 30b being that they are individually longer than the other pins 25. The other pins 25 correspond to the other signals of the SCSI interface and upon insertion of connector 10 with connector 410 mate with receiving holes 55 after the long pins 30a 30b mate.

The long pins 30a and 30b are adapted for mating with holes 50a 50b in order to assert the SCSI busy line before the mating of the other pins 25 with receiving holes 55 of connector 410. When connector 10 is inserted (coupled) into connector 410, the long pins 30a 30b mate to receiving holes 50a 50b just before the mating of the remainder pins 25 to receiving holes 55. Under the present invention, this will allow the SCSI bus to complete any communication in progress (before the mating of the pins 25) and then terminate further data transfer just before and throughout the mating of the receiving holes 55 and pins 25. Signal glitching during this mating process will not interfere with data communication since communication is temporarily terminated.

Using typical manual insertion techniques, the 1–3 mm of extra length for pins 30a 30b provides that the SCSI busy signal will be asserted at least 10 ms in advance of the other pins 25 mating with receiving holes 55 when connector 10 is inserted into connector 410. As will be discussed in relation to FIG. 4, this timing provides that communication over the SCSI interface will terminate in advance of the mating of pins 25 and 55. It is appreciated that an embodiment of the present invention is described with respect to the male connector 10 associated with the inserted peripheral 40 and the female connector 410 associated with the remainder of the operating computer system 112. However, within the scope of the present invention it is appreciated that these connectors can be swapped in position with equal effect as to the operation of the present invention.

It is appreciated that the circuitry required to assert the busy signal, once pins 30a 30b are inserted into holes 50a and 50b, can be readily generated. For instance, pins 30a and 30b as shown in FIG. 1A are coupled together and can be used to complete a circuit on the receiving side between holes 50a and 50b. On the receiving side, pins 30a 30b couple to assert a signal over a wired OR circuit to drive (assert) the busy line of the SCSI pin. In this way, the busy line of the SCSI bus can be driven busy by more than one device. As will be discussed in further detail to follow, once initiated, the receiving circuitry holds the busy line asserted for a predetermined period before dropping the busy line. This is done to ensure that the coupling is performed while the busy line is asserted.

FIG. 1B illustrates that the present invention can be used in an environment wherein bus 12' is a backplane SCSI bus that is capable of coupling to several peripheral devices 40a, 40b and 40c. The peripherals each have an associated connector 10a, 10b and 10c, implemented within the design of the present invention connector 10 (of FIG. 1A). These connectors 10a, 10b and 10c are SCA connectors. On the backplane bus 12', there are several receiving connectors 410a, 410b, 410c which are also SCA connectors implemented within the design of the 410 connector. Peripheral 40c utilizes a small ribbon cable or flex circuit 14 which contains SCA connector 10c for coupling with connector 410c. Although not shown, the peripheral devices 40a, 40b, and 40c can be mounted on rails which serve to guide the peripheral for connection to the backplane 12' and also to support the peripheral when installed.

Figure 2:
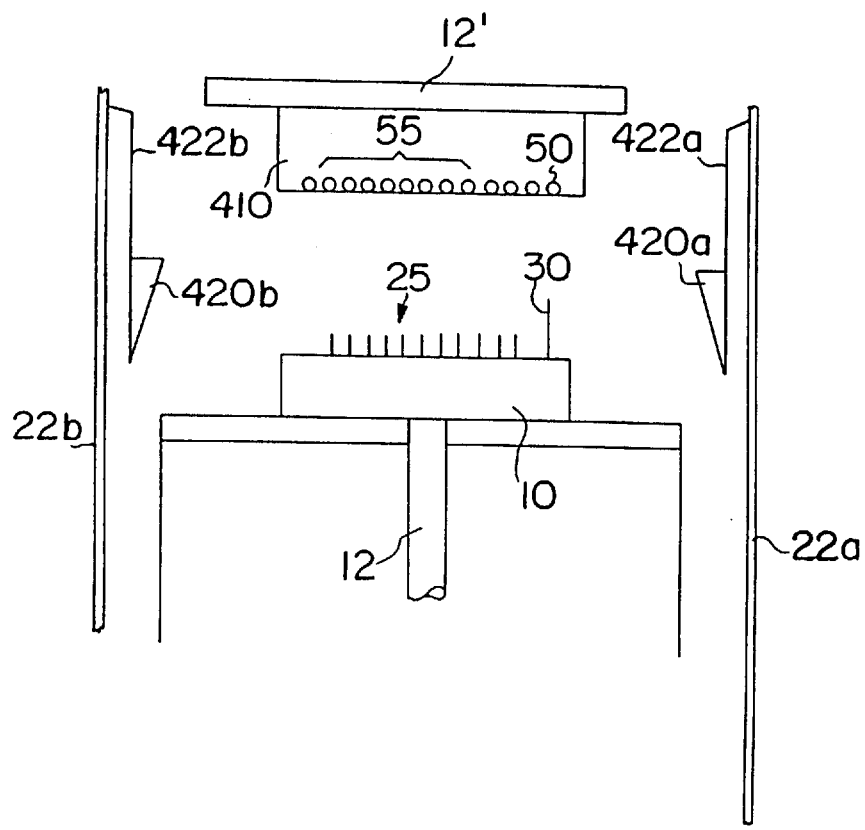
FIG. 2 illiterates a long pin embodiment of the present invention with a mechanism for regulation of the insertion speed of the connectors.

FIG. 2 illustrates an embodiment of the present invention for regulating the manual mating technique of connector 10 and connector 410. As shown, connector 410 is mounted on a backplane SCSI bus 12'. Using this mechanism, the speed at which the pins of connector 10 and the holes of connector 410 mate is regulated. According to this embodiment, the connector 410 is surrounded on two ends with rails 22a and 22b onto which are mounted protruding brackets 422a and 422b. On each bracket is located a wedge shaped obstruction mechanism 420a and 420b. The wedge shaped obstructions 420a and 420b receive the connector 10 and prevent the connector 10 from reaching the connector 410 until a slight and appropriate activation force is applied to the connector 10. At which time, the braces 422a and 422b will give way slightly (under force from the wedge shaped obstructions 420a and 420b) and move away from the body of connector 10. This will allow the obstructions 420a and 420b to move slightly out of the way of connector 10 and which time the connector 10 will "snap" into receiving connector 410. By application of some small activation force to the peripheral containing connector 10, the resulting "snap" action will regulate the speed at which the long pins 30a and 30b and pins 25 mate with the holes 50a and 50b and 55, respectively.

It is appreciated that the connector 410, in addition to the brackets 422a 422b and obstructions 420a 420b, can further include a small guide that surrounds the connector 410 (in addition to the rails 22a and 22b) in order to further properly align the connector pins 30a and 30b and pins 25 to the receiving holes 50a and 50b and 55 so that during the above snap operation the pins are not damaged due to misalignment. Using either the embodiments of FIG. 1A or FIG. 1B or the embodiment of FIG. 2, the present invention provides for approximately 10 ms of time between the mating of the long pins 30a 30b to holes 50a 50b and the mating of the remainder of pins 25 to holes 55.

Figure 3:
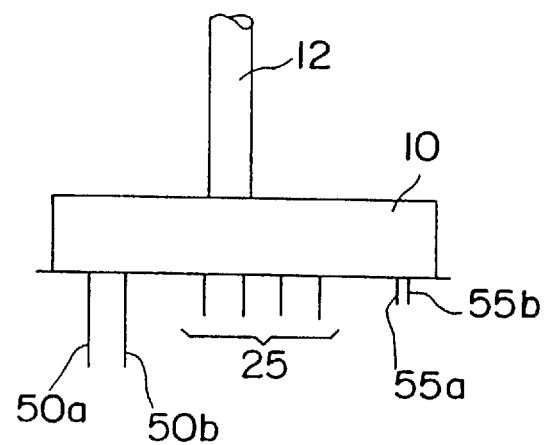
FIG. 3 illustrates a short pin embodiment of the present invention used during hot removal of a device from an operating SCSI interface.

FIG. 3 illustrates an embodiment of the present invention that can be utilized in conjunction with the embodiments of FIG. 1 and FIG. 2 but contains the additional feature of providing a busy assertion mechanism for hot removal of the peripheral device. Located on connector 10 are a pair of short pins 55a and 55b. When removing or decoupling connector 10 from connector 410, the connector 10 is gripped manually and pulled out of the connector 410. The short pins 55a and 55b are approximately 1–3 mm shorter than the pins 25. The short pins detach from respective receiving holes located on connector 410 and cause the SCSI busy line to become asserted before the remainder of the pins 25 are decoupled. The assertion is in the analogous fashion as described with respect to the long pin embodiment of the present invention. Namely, the SCSI busy line is asserted and held asserted for a predetermined time period to cover the time required to separate the remainder of the pins 25 from the holes 55. Again, glitches that occur during the separation will not affect any data transmission because data transmission terminates before the separation, under the present invention.

Under the embodiments of the present invention, assertion of the SCSI busy line, under the present invention, can come from initial contact of the long pins 30a 30b to the receiving holes 50a and 50b upon insertion and/or from the decoupling of short pins 50a and 50b from respective receiving holes located on connector 410 upon removal. It is appreciated that a similar mechanism as described in FIG. 2 can be applied to the embodiment of FIG. 3 wherein a certain activation force is required to remove the connectors 410 and 10. In such embodiment, a certain amount of activation force is required detach SCA connectors 410 and 10 so that the connectors withdraw at a uniform rate.

An other embodiment of the present invention is realized wherein the obstruction mechanisms are implemented with a set of cams. In this implementation the peripheral that slides along the track and the configuration contains a handle that cams the entire assembly.

Figure 4:
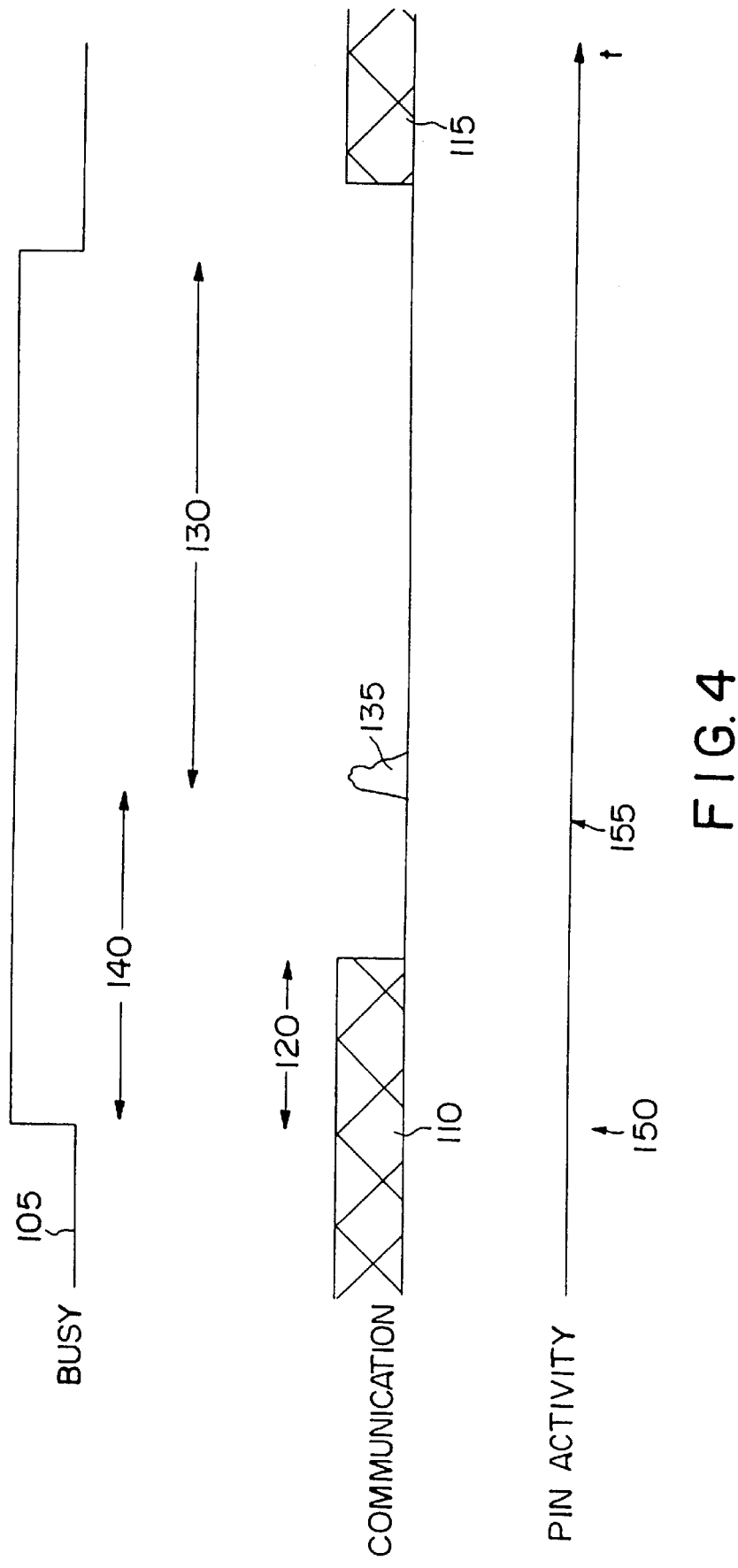
FIG. 4 is a timing diagram illustrating the events and time periods of the present invention for the hot insertion and hot removal embodiments.

FIG. 4 illustrates an exemplary timing diagram of the different embodiments of the present invention. The hot insertion is discussed first. The SCSI busy line is shown as signal 105. At point 150 the long pins 30a 30b mate with receiving holes 50a 50b. The long pins insertion causes the SCSI busy line to become asserted (here shown as a high level but the busy line could also be low asserted). At this time, signal 110 indicates that some communication traffic is currently being generated over the SCSI line. Due to the extra length of the long pins, the remainder pins 25 will not mate with their receiving holes 55 until some time period later, e.g., time period 140. This time with respect to an exemplary embodiment of the present invention is roughly 10 ms. Given the transmission characteristics of the SCSI interface protocol, once the SCSI busy line is asserted at time 150, the longest expected communication over the SCSI line can be made to complete within 4 ms or less. This time period is programmable through the SCSI Mode Select pages. Therefore, the time period when the longest communication is expected to end after the insertion of the long pins 30a 30b is shown as period 120. At the end of period 120, as shown, communication signal 110 terminates. The assertion of the SCSI busy line effectively prevents arbitration.

As shown in FIG. 4, at some time after the expiration of period 120, the remainder of the signal pins 25 mate with connector 410. At the end of period 140 these pins 25 mate and a small signal glitch or transient pulse is shown as 135. Note that glitch 135, if it occurs at all, occurs during a period when no communication is conducted over the SCSI bus. Arrow 155 indicates the point in time of the complete mating of connector 410 and connector 10 and coincides with glitch 135.

The initial insertion of the long pins 30a 30b into receiving holes 50a 50b triggers the SCSI busy line to remain asserted for approximately 50 ms (time period 140 plus period 130), but this duration is exemplary and can be varied. This time duration is required to ensure that the busy line will be asserted during the expected time period of when the pins 25 mate with holes 55. The time period 130 indicates the time after the connector 410 and connector 10 mate and when the busy line becomes deasserted by the present invention. It is appreciated that the time period 140 and 130 can be controlled via a number of different and well known circuit techniques and can include a one-shot circuit, for example. At the end of the time period 130, the SCSI bus is free and communication can start again, as shown in signal 115.

With reference to FIG. 4, the embodiment of the present invention as shown in FIG. 3 is now described. In this case, arrow 150 represents the initial time at which the short pins 55a 55b decouple from their respective receiving holes within connector 410. Then the remainder of the pins of connectors 410 and 10 are decoupled at point 155, causing a potential glitch 135. At point 150, the decoupling of the short pins 55a 55b causes the SCSI busy signal to be asserted and maintained for 50 ms, for instance. Valid communication is expected to end before 4 ms after the decoupling of short pins 55a 55b (e.g., before the expiration of period 120). This time period 120 will elapse before the connectors 410 and 10 can be physically separated. As shown with respect to this embodiment, the point during which the glitch occurs 155 is not associated with signal transmission over the SCSI line.

Figure 5:
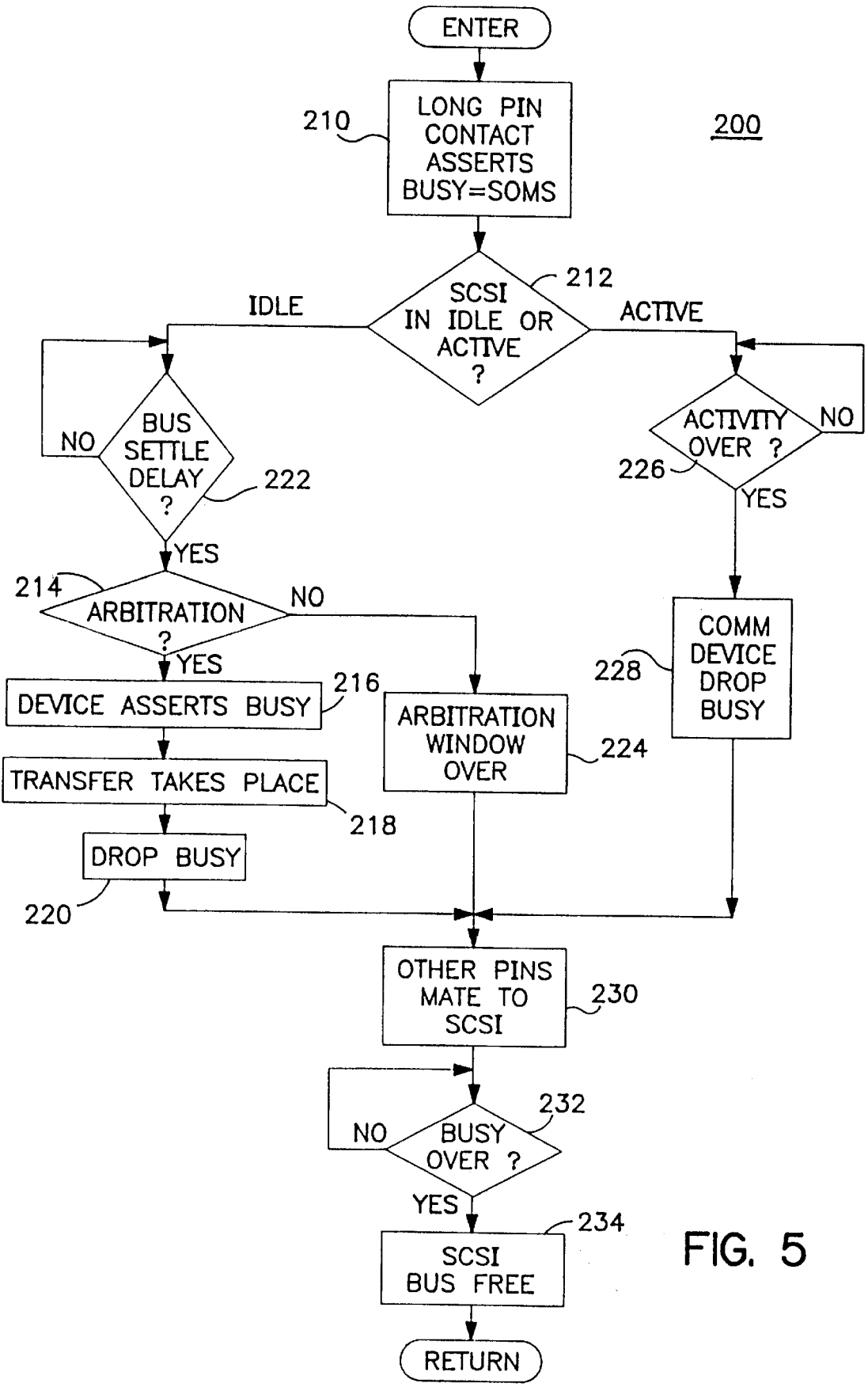
FIG. 5 is a flow diagram illustrating steps of the present invention method for performing hot insertions of a device to a SCSI interface.

FIG. 5 illustrates a flow diagram of steps of the present invention method 200 for performing hot insertion of a device into a SCSI interface. The process 200 enters and processing of block 210 involves mating the long pins 30a 30b to initially assert the busy line of the SCSI line via a line driver circuit. Also at block 210, a timing circuit (such as a one-shot or counting circuit) asserts the busy line for a time period of approximately 50 ms. At block 212, depending on whether or not the SCSI interface is idle or active when the long pins 30a 30b is inserted into receiving hole 50, the processing flows to block 222 or block 226. The SCSI protocol contains a "bus free" phase in which the SCSI is idle and contains an "arbitration" phase in which devices compete for communication rights over the SCSI interface. If the SCSI line is idle at block 212 (e.g., idle when the long pin mates), then the assertion of the busy signal by the long pins 30a 30b will place the SCSI interface into an "arbitration" phase.

At block 222 the present invention delays for a short period of time called a bus settle delay and then block 214 is entered. At block 214, it is determined if any device is actively participating in the arbitration (e.g., requesting immediate communication). If not, processing flows to block 224 wherein the arbitration window is closed due to expiration of the bus settle delay. If no device participates in arbitration after the bus settle delay, then at block 224 the arbitration window is closed. At this time, no device can communicate over the SCSI because the busy line is asserted by the present invention and because the arbitration window effectively closed. Processing then flows to block 230.

At block 214, if a device indicates that it is going to participate in arbitration, then at block 216 this device is allowed to win the arbitration and the communicating device asserts the busy line of the SCSI (which is also being asserted from block 210). At block 218, the device is allowed to transfer information over the SCSI bus and at block 220 the communicating device drops the busy line after the communication (but the busy line is maintained from block 210). It is appreciated that the transfer of block 218 will end within a known and programmable time period, e.g., 4 ms. Since the present invention maintains the busy signal, no arbitration may take place and no other device may communicate over the SCSI bus at the expiration of this time. Processing then flows to block 230.

At block 212 of FIG. 5, if the SCSI bus is not idle (e.g., it is active) then processing flows to block 226 where the current communication in progress is allowed to complete. When complete, no arbitration will engage because the SCSI busy line is asserted by the present invention. The current active communication will terminate within 4 ms. At block 228, the SCSI busy line is dropped by the communicating device (but is also being asserted from block 210). Processing then continues to block 230.

At block 230, the other pins 25 of connector structure 10 mate with the connector 410 and a possible glitch may occur within the timing of block 230; however, since communication is ensured to be terminated at this time no data corruption is possible. Given typical manual insertion velocity, these pins 25 mate with connector 410 roughly 10 ms after the long pins 30a 30b mates. This speed can be regulated by the embodiment of FIG. 2. At block 232, the time period that the busy line is asserted (started at block 210) is allowed to complete. At block 234, the busy line is deasserted to make the SCSI bus free and normal communication is allowed to occur.

Any transients or glitches will terminate before block 234 is entered because of the time period allowed during block 232. Method or process 200 therefore allows a hot insertion without causing transmission errors, without requiring custom firmware or software within devices that require retransmission of information after the reset condition, and without causing an unacceptable amount of delay (e.g., 50 ms).

The operation of the present invention utilizing short pins 55a 55b for hot removal of a peripheral device is similar to process 200 of FIG. 5 except that at block 210 the removal of short pins 55a and 55a from their respective holes on connector 410 triggers assertion of the SCSI busy line. At block 230, this refers to the remainder of the pins decoupling from the connector 410 which can cause a signal glitch.

FIG. 6 illustrates exemplary circuitry that can be applied within the embodiments of the present invention. FIG. 6 illustrates a circuit for hot insertion embodiments (of FIG. 1 and FIG. 2). A voltage source Vcc is coupled to one end of a pull up resistor 502 and the other end of the resistor 502 is coupled to input of a line driver 510. The input node of the line driver 510 corresponds to receiving hole 50a. Receiving hole 50b corresponds to a ground node. Long pins 30a and 30b are coupled together within connector 10 and when inserted into the receiving holes 50a and 50b cause the signal at the input of the line driver 510 to be pulled down to ground. Otherwise, this the node at the input of driver 510 is at a high voltage level. When pulled down to ground, circuit 520 (e.g., a one shot or other counting device) then maintains an asserted signal which is driven over the SCSI busy line 540 via an open collector driver 525. The SCSI busy line is driven for a predetermined but short period (e.g., 50 ms). The signal output from 525 is a wired OR busy line and therefore line 540 may be held asserted by other devices. It is appreciated that the circuitry of FIG. 6 can be located within the backplane 12' electronics.

A similar circuit as shown in FIG. 6 can be implemented for the hot removal embodiment of FIG. 1 wherein the one shot 520 is implemented to trigger upon the signal at the input of driver 510 being pulled up to Vcc upon removal of the short pins 55a 55b from their respective receiving holes. The one shot then maintains asserted the busy line 540 in the analogous manner.

It is appreciated that the 50 ms busy assertion period is selected because it is long enough to ensure that the connector mating has completed but not long enough to cause a perceptible delay within the SCSI interface. An alternative embodiment, within the present invention, is to detect when the connectors 410 and 10 have fully mated, then to turn off the busy line at this time.

The preferred embodiment of the present invention, a mechanism and method for maintaining SCSI bus data integrity during periods of hot modification, is thus described. While the present invention has been described in particular embodiments, it should be appreciated that the present invention should not be construed as limited by such embodiments, but rather construed according to the below claims.

What is claimed is:

1. A method of connecting a device to a single ended SCSI bus that is in use while maintaining data integrity, wherein said single ended SCSI bus includes a busy line and wherein said device includes a connector with signal pins that mate with said single ended SCSI bus, said method comprising the steps of:

asserting a SCSI busy signal on said busy line a minimum time in advance of connecting said signal pins of said device to said single ended SCSI bus, said minimum time being the longest expected time before a SCSI communication will terminate;

starting a timing device adapted to provide an indication of when a predetermined time has elapsed;

coupling said signal pins of said device to said single ended SCSI bus;

testing said timing device; and deasserting said SCSI busy signal when said predetermined time has elapsed.

2. The method of claim 1 wherein the step of asserting a SCSI busy signal on said single ended SCSI bus a minimum time in advance of connecting said signal pins of said device to said single ended SCSI bus includes:

detecting the electrical contact of said connector to said single ended SCSI bus prior to said signal pins making electrical contact therewith; and asserting said SCSI busy signal upon said detection.

3. A system for connecting a device to a single ended SCSI bus that is in use while maintaining data integrity, wherein said single ended SCSI bus includes a busy line and wherein said device includes a connector with signal pins, said system comprising:

means connected to said single ended SCSI bus for asserting a SCSI busy signal on said busy line a minimum time in advance of connecting said signal pins of said device to said single ended SCSI bus, said minimum time being the longest expected time before a SCSI communication will terminate;

means connected to said single ended SCSI bus for deasserting the SCSI busy signal a predetermined period after its assertion; and means for coupling said signal pins of said device to said single ended SCSI bus during the time that said busy signal is asserted.

4. The system of claim 3 wherein said means for asserting a SCSI busy signal on said busy line a minimum time in advance of connecting said signal pins of said device to said single ended SCSI bus, said minimum time being the longest expected time before a SCSI communication will terminate comprises:

detector means for detecting electrical contact of said connector to said single ended SCSI bus and supply an electrical output signal; and circuit means connected to said detector means and to said busy line, said circuit means adapted for initiating and maintaining said busy signal on said busy line for a predetermined period of time.

5. The system of claim 4 wherein said detector means includes:

long pins coupled to said connector, said long pins being longer than said signal pins and adapted for mating with said single ended SCSI bus in advance of said signal pins when said connector is coupled to said single ended SCSI bus; and circuit means for supplying an output electrical signal when said long pins make contact with said single ended SCSI bus.

6. A system for coupling a device to a single ended SCSI bus that is in use while maintaining data integrity, wherein said single ended SCSI bus includes a busy line said system comprising:

a connector having a first side connected to said device and a second side connected to said single ended SCSI bus, said connector having a set of signal pins for carrying electrical signals, a set of long pins for making first contact when said first and second sides are connected, and a set of short pins for first breaking contact when said first and second sides are disconnected; and electrical circuitry connected to said connector and to said busy line for detecting said first contact through said long pins and said first breaking contact through said short pins and supplying a busy signal for a predetermined time on said busy line when first contact and said first breaking contact are detected.

7. The system of claim 6 further including spring mounted obstructions mounted on one side of said connector and interacting with the other side of said connector so as to mechanically resist but not prevent the connection of said first and second sides.

8. A method of disconnecting a device from a single ended SCSI bus that is in use while maintaining data integrity, wherein said single ended SCSI bus includes a busy line and wherein said device includes a connector with signal pins that mate with said single ended SCSI bus, said method comprising the steps of:

asserting a SCSI busy signal on said busy line a minimum time in advance of disconnecting said signal pins of said device from said single ended SCSI bus, said minimum time being the longest expected time before a SCSI communication will terminate;

starting a timing device adapted to provide an indication of when a predetermined time has elapsed;

decoupling said signal pins of said device from said single ended SCSI bus;

testing said timing device; and deasserting said SCSI busy signal when said predetermined time has elapsed.

9. The method of claim 8 wherein the step of asserting a SCSI busy signal on said single ended SCSI bus a minimum time in advance of disconnecting said signal pins of said device from said single ended SCSI bus includes:

detecting the breaking of electrical contact of said connector to said single ended SCSI bus prior to said signal pins breaking electrical contact therewith; and asserting said SCSI busy signal upon said detection.

* * * * *